United States Patent
Masuda et al.

(10) Patent No.: US 6,365,641 B1
(45) Date of Patent: Apr. 2, 2002

(54) PROCESS FOR PRODUCING HEAT-EXPANDABLE MICROCAPSULES

(75) Inventors: Toshiaki Masuda; Sachiko Tokumura, both of Yao (JP)

(73) Assignee: Matsumoto Yushi-Seiyaku Co Ltd, Osaka (JP)

( * ) Notice: Subject to any disclaimer, the term of this patent is extended or adjusted under 35 U.S.C. 154(b) by 0 days.

(21) Appl. No.: 09/869,833

(22) PCT Filed: Sep. 27, 2000

(86) PCT No.: PCT/JP00/06660

§ 371 Date: Jul. 6, 2001

§ 102(e) Date: Jul. 6, 2001

(87) PCT Pub. No.: WO01/23081

PCT Pub. Date: Apr. 5, 2001

(30) Foreign Application Priority Data

Sep. 29, 1999 (JP) .............................. 11-314198

(51) Int. Cl.$^7$ .............................. B01J 13/02; C08J 9/32
(52) U.S. Cl. .............................. 521/56; 521/60
(58) Field of Search ..................... 521/56, 60

(56) References Cited

U.S. PATENT DOCUMENTS

| 3,615,972 A | 10/1971 | Morehouse et al. |
| 5,155,138 A | 10/1992 | Lundqvist |
| 5,368,609 A | 11/1994 | Inoue |
| 5,571,652 A | 11/1996 | Asano et al. |

FOREIGN PATENT DOCUMENTS

| JP | 60-019033 | 1/1985 |
| JP | 6210156 | 3/1994 |
| JP | 07-096167 | 4/1995 |
| JP | 2894990 | 1/1997 |
| JP | 11-209504 | 8/1999 |
| JP | 11-269311 | 10/1999 |
| WO | 97-33686 | 9/1997 |

*Primary Examiner*—Morton Foelak

(57) ABSTRACT

The present invention provides a process for producing thermo-expansive microcapsules that disperse better than conventional products. In this process, thermo-expansive microcapsules are produced through suspension-polymerization in which a polymer is produced from polymerizing unsaturated ethylene monomers under the existence of one or more of metal compounds selected among zirconium compounds and titanium compounds and the resultant polymer microencapsulates a volatile blowing agent gasifying below the softening point of the polymer.

2 Claims, No Drawings

PROCESS FOR PRODUCING HEAT-EXPANDABLE MICROCAPSULES

TECHNICAL FIELD

The present invention relates to the production Process for thermo-expansive microcapsules, more precisely, thermo-expansive microcapsules that disperse well in a medium such as paint or ink.

TECHNICAL BACKGROUND

The production process of thermo-expansive microcapsules wherein a thermoplastic polymer microencapsulates a volatile blowing agent gasifying below the softening point of the thermoplastic polymer and forms microcapsules has been studied. Japanese Patent Publication Sho 42-26524 describes a production process that covers general thermo-expansive microcapsules and U.S. Pat. No. 3615972 describes the production process for thermo-expansive microcapsules having a polymer shell of uniform thickness. And Japanese Patent No. 2894990 describes the production process for heat resistance and thermo-expansive microcapsules consisting 80% or more of acrylonitrile monomer.

In those known processes, thermo-expansive microcapsules are produced in suspension-polymerization wherein an inorganic additive such as colloidal silica is employed as a dispersing and stabilizing agent and an organic additive is employed as a stabilizing auxiliary.

Those known thermo-expansive microcapsules do not disperse well in a medium such as polymers, paints and inks, in other words, it is difficult to disperse the microcapsules uniformly in a medium. The cause of the problem is estimated to be inorganic additives used as a dispersant and remaining on microcapsule surface.

On the other hand, Japanese Patent No. 2584376 describes a production process for expansive thermo-plastic fine particles wherein a powder stabilizer comprising the metal salt or hydroxide of one of Ca, Mg, Ba, Fe, Zn, Ni and Mn is employed. In this process an acid must be added after polymerization for the purpose of removing the powder stabilizer from the surface of fine particles. And it is not easy to produce fine particles as aimed. In addition, it is difficult to produce fine particles constantly in this process because of difficult pH control.

Japanese Patent Laid Open Publication Hei 11-209504 describes a process wherein expansive particles that expand quickly and uniformly are produced through suspension polymerization of polymerizing mixture without polymer coagulation by employing one or more of the compounds selected from the group comprising alkali metal nitrites, stannous chloride, stannic chloride, water-soluble ascorbic acids and boric acid. Even in this process inorganic additives and powder stabilizers cannot easily be removed from resultant particles and the particles do not disperse well in various media.

DISCLOSURE OF INVENTION

The object of the present invention is to solve the above problems and to provide the production process of thermo-expansive microcapsules which disperse better than conventional products.

Other objects and advantage of the present invention are shown in the following description.

The above objects and advantage of the present invention are attained by the production process of thermo-expansive microcapsules wherein a polymer is produced by polymerizing unsaturated ethylene monomers and the polymer microencapsulates a volatile blowing agent having a gasifying point lower than the softening point of the polymer and forms thermo-expansive microcapsules. Said process is characterized by the the polymer produced through the suspension-polymerization of unsaturated ethylene monomers under the existence of one or more of metal compounds selected from the group comprising zirconium compounds and titanium compounds.

The preferable zirconium and titanium compounds which sufficiently function in the process of the present invention are metal compounds such as zirconium sulfate, zirconium acetate, zirconium chloride, zirconium oxide, zirconium nitrate, titanium chloride, titanium oxide and titanium sulfate. Among those, zirconium sulfate and titanium chloride are more preferable because they are available in the form of aqueous solution that can be added to the water phase in the process with less labor. The above metal compounds bring a new advantage different from those of the conventional processes. In the conventional processes, inorganic additives functioning as a dispersing and stabilizing agent are incorporated in the wall of microcapsules during polymerization and cannot be removed easily. Such additives included in the wall of microcapsules inhibit the dispersion of such microcapsules in various media. In the process of the present invention, inorganic additives, are not incorporated in the wall of microcapsules and thus no labor for removing the additives is necessary. In addition, the additives function as a superior dispersing and stabilizing agent that can attain constant polymerization. Thus the thermo-expansive microcapsules produced in the process have superior property on their surface and disperse well in various media such as polymers, paints and inks.

The process for producing the thermo-expansive microcapsules of the present invention is similar to the conventional processes except employing the above-mentioned metal compounds. In the process, polymerizing monomers and a cross-linking agent are blended with a volatile blowing agent and an initiator and the mixture is processed in suspension-polymerization in an aqueous medium containing a proper quantity of an emulsifier and dispersant. The polymerizing monomers, cross-linking agent, initiator, volatile blowing agent, dispersing and stabilizing agent and other agents are not restricted within a certain range but are those already known.

The examples of the unsaturated ethylene monomers applied in the present invention are nitrile monomers, methacrylate, acrylate, vinylidene chloride, vinyl chloride, styrene, vinyl acetate and butadiene. One of those monomers or the combination of two or more of those monomers can be used. The combination can be determined according to the softening point, thermo-durability, durability against chemicals and end use of resultant polymer. For example, copolymers containing vinylidene chloride or nitrile monomers have superior gas-shielding function and copolymers containing 80 weight percent or more of nitrile monomers have superior thermo-durability and durability against chemicals.

Cross-linking agents can be added to unsaturated ethylene monomers if necessary. The examples of such cross-linking agents are divinyl benzene, ethylene glycol dimethacrylate, triethylene glycol dimethacrylate, triacryl formal, trimethylol propane tri-methacrylate, aryl methacrylate, 1,3-butyl glycol dimethacrylate and triaryl isocyanate.

The polymer which forms the wall of microcapsules is prepared by adding polymerization initiator to the above components and polymerizing them. Known initiators, such as peroxides and azo compounds, can be used. Azobis isobutylonitrile, benzoyl peroxide, lauryl peroxide, diisopropyl peroxydicarbonate, t-butyl peroxide and 2,2'-azobis (2,4-dimetyl) valeronitrile are the examples of such initiators. Oil-soluble initiators which are soluble in the monomers used for polymerization are preferable.

Volatile blowing agents encapsulated into microcapsules are known agents, which gasify below the softening point of capsule-wall polymers. Examples of those agents are low-boiling-point liquid including propane, propylene, butene, normal butane, isobutane, isopentane, neopentane, normal pentane, hexane, heptane, petroleum ether, halogen compounds of methane and tetra-alkyl silane or compounds gasifying through thermal degradation under heating, such as AIBN. A preferable blowing agent is one of or a mixture of two or more of low-boiling-point liquid, such as isobutane, normal butane, normal pentane and isopentane.

The aqueous medium in which suspension-polymerization is carried out can be prepared by adding a dispersing and stabilizing agent in deionized water and stabilizing auxiliaries are added if necessary. The examples of the dispersing and stabilizing agents are silica, calcium phosphate, calcium carboxylate, sodium chloride and sodium sulfate. The examples of the stabilizing auxiliaries used with the said dispersing and stabilizing agent are di-ethanol amine-adipic acid condensates, gelatin, methyl cellulose, polyvinyl alcohol, polyethylene oxide, dioctyl sulfosuccinate, sorbitane ester and emulsifiers. The polymerization of the present invention is carried out by adding the above-mentioned metal compound in the aqueous medium and by controlling the pH of the mixture approximately. 1 to 4, preferably 2 to 3.

EXAMPLES

The present invention is further described with the following examples and comparative examples though the present invention is not restricted within the scope of those examples.

Comparative example 1

A water phase was prepared by adding 1.5 g of adipic acid-di-ethanol amine condensate and 60 g of 20-% colloidal silica aqueous solution into 600 g of ion-exchanged water, controlling the pH of the solution at 3.0 to 3.2 with sulfuric acid and mixing homogeneously.

An oil phase was prepared by mixing 150 g of acrylonitrile, 150 g of methyl methacrylate, 1 g of tri-methylol propane tri-methacrylate, 35 g of petroleum ether and 10 g of isobutane and agitating to dissolve the mixture.

These water phase and oil phase were mixed and then agitated with a homogenizer at 7,000 rpm for 2 minutes to be made into suspension. The suspension was transferred to a separable flask and the air was displaced with nitrogen gas. Then the suspension was reacted at 60° C. with agitation for 20 hours.

After the reaction, the resultant product was cooled down and filtrated into moist lump of powder containing 70% solid. The lump was dried at normal temperature and crashed into microcapsules.

The particle size of the resultant microcapsules was 10 to 20 $\mu$m and the microcapsules contained 1.2 weight percent of ash.

The microcapsules was then dispersed in EVA paste and painted on paper with a roller. The resultant surface showed asperities estimated to have been caused from non-dispersed and coagulated microcapsules and was not processed into uniformly coated surface after expansion.

Example 1

Microcapsules were produced in the same manner as in Comparative Example 1 except the pH of the water phase was adjusted at 1.8 to 2.2 and 0.3 g of the aqueous solution of zirconium sulfate was added to the water phase.

The particle size of the resultant microcapsules was 10 to 20 $\mu$m and the microcapsules contained 0.5 weight percent of ash.

The microcapsules was then dispersed in EVA paste and painted on paper with a roller. The paste could be painted smoothly and gave uniformly coated surface after expansion.

Example 2

Microcapsules were produced in the same manner as in Comparative Example 1 except the pH of the water phase was adjusted at 1.8 to 2.2 and 0.2 g of the aqueous solution of titanium tetrachloride was added to the water phase.

The particle size of the resultant microcapsules was 10 to 20 $\mu$m and the microcapsules contained 0.3 weight percent of ash.

The microcapsules was then dispersed in EVA paste and painted on paper with a roller. The paste could be painted smoothly and gave uniformly coated surface after expansion.

Comparative Example 2

A water phase was prepared by adding 2 g of adipic acid-di-ethanol amine condensate, 60 g of 20-% colloidal silica aqueous solution and 100 g of salt in 500 g of ion-exchanged water, controlling the pH of the solution at 3.4 to 3.6 with sulfuric acid and mixing homogeneously.

An oil phase was prepared by mixing 150 g of acrylonitrile, 100 g of methacrylonitrile, 10 g of methyl methacrylate, 2 g of azobis isobutylonitrile and 50 g of isopentane and agitating to dissolve the mixture.

These water phase and oil phase were mixed and then agitated with a homogenizer at 7,000 rpm for 2 minutes to be made into suspension. The suspension was transferred to a separable flask and the air was displaced with nitrogen gas. Then the suspension was reacted at 70° C. with agitation for 20 hours.

After the reaction, the resultant product was cooled down and filtrated into moist lump of powder containing 70% solid. Then the lump was dried at normal temperature and crashed into microcapsules.

The particle size of the resultant microcapsules was 20 to 30 $\mu$m and the microcapsules contained 10.8 weight percent of ash.

The microcapsules was then dispersed in EVA paste and painted on paper with a roller. The resultant surface showed asperities estimated to have been caused from non-dispersed and coagulated microcapsules and was not processed into uniformly coated surface after expansion.

Example 3

Microcapsules were produced in the same manner as in Comparative Example 2 except the pH of the water phase was adjusted at 2.3 to 2.5 and 0.5 g of 18-% zirconium oxide aqueous solution was added to the water phase.

The particle size of the resultant microcapsules was 20 to 30 μm and the microcapsules contained 5.3 weight percent of ash.

The microcapsules was then dispersed in EVA paste and painted on paper with a roller. The paste could be painted smoothly and gave uniformly coated surface after expansion.

Example 4

Microcapsules were produced in the same manner as in Comparative Example 2 except the pH of the water phase was adjusted at 2.3 to 2.5 and 0.2 g of the aqueous solution of titanium sulfate was added to the water phase.

The particle size of the resultant microcapsules was 20 to 30 μm and the microcapsules contained 3 weight percent of ash.

The microcapsules was then dispersed in EVA paste and painted on paper with a roller. The paste could be painted smoothly and gave uniformly coated surface after expansion.

Comparative Example 3

A water phase was prepared by adding 0.03 g of sodium lauryl sulfate, 20 g of magnesium chloride and 60 g of salt into 500 g of ion-exchanged water, controlling the pH of the solution at 9.5 with sodium hydroxide and mixing homogeneously.

An oil phase was prepared by mixing 150 g of acrylonitrile, 100 g of methacrylonitrile, 10 g of methyl methacrylate, 2 g of azobis isobutylonitrile and 50 g of isopentane and agitating to dissolve the mixture.

These water phase and oil phase were mixed and then agitated with a homogenizer at 7,000 rpm for 2 minutes to be made into suspension. The suspension was transferred to a separable flask and the air was displaced with nitrogen gas. Then the suspension was reacted at 70° C. with agitation for 20 hours.

The mixture under the reaction had high viscosity and microcapsules coagulated to each other.

An acid was added to control the pH of the reaction mixture at 4 to 5 and the stabilizer powder ($Mg(OH)_2$) was removed.

After the reaction, the resultant product was filtrated into moist lump of powder containing 70% solid. Then the lump was dried at normal temperature and crashed into microcapsules.

The particle size of the resultant microcapsules was 20 to 30 μm and the microcapsules contained 5.5 weight percent of ash.

The microcapsules was then dispersed in EVA paste and painted on paper with a roller. The resultant surface showed asperities estimated to have been caused from coagulated microcapsules and was not processed into uniformly coated surface after expansion.

Effects of the Invention

The production process of the thermo-expansive microcapsules of the present invention provides thermo-expansive microcapsules which have less inorganic dispersant on their surface and disperse better in various media such as polymers, paints and inks, comparing to similar microcapsules produced in conventional processes.

What is claimed is:

1. A production process for thermo-expansive microcapsules in which a polymer is produced in the polymerization of unsaturated ethylene monomers and a volatile blowing agent gasifying below the softening point of the polymer is microencapsulated with the polymer to produce thermo-expansive microcapsules, the process which is characterized by the application of a polymer produced in suspension-polymerization of unsaturated ethylene monomers under the existence of one or more of metal compounds selected from the group consisting of zirconium compounds, titanium chloride and titanium sulfate for the polymer.

2. A production process of claim 1, wherein the zirconium compounds are zirconium sulfate, zirconium acetate, zirconium chloride, zirconium oxide and zirconium nitrate.

* * * * *